United States Patent [19]
Nakamura et al.

[11] Patent Number: 6,108,353
[45] Date of Patent: Aug. 22, 2000

[54] DEMODULATING APPARATUS

[75] Inventors: Jin Nakamura, Kanagawa; Tatsuya Tsuruoka, Tokyo; Kiyoshi Nomura, Kanagawa, all of Japan

[73] Assignee: Sony Corporation, Tokyo, Japan

[21] Appl. No.: 09/007,699

[22] Filed: Jan. 15, 1998

[30] Foreign Application Priority Data

Jan. 20, 1997 [JP] Japan ..................................... 9-007956

[51] Int. Cl.⁷ ...................................................... H04J 3/06
[52] U.S. Cl. ............................................ 370/504; 370/208
[58] Field of Search ..................................... 370/504, 203, 370/206, 208, 210, 212, 213, 277, 282, 304, 324, 350, 503, 508, 514, 519, 520, 204, 205, 215, 233, 329, 336, 339, 341

[56] References Cited

U.S. PATENT DOCUMENTS

| 5,602,835 | 2/1997 | Seki et al. | 370/206 |
| 5,694,389 | 12/1997 | Seki et al. | 370/208 |
| 5,774,450 | 6/1998 | Harada et al. | 370/206 |
| 5,787,123 | 7/1998 | Okada et al. | 375/324 |
| 5,818,813 | 10/1998 | Saito et al. | 370/208 |

*Primary Examiner*—Dang Ton
*Assistant Examiner*—Phirin Sam
*Attorney, Agent, or Firm*—Jay H. Maioli

[57] ABSTRACT

A demodulating apparatus according for demodulating a modulated signal obtained by modulating a plurality of carriers having different frequencies, includes a data demodulating circuit for demodulating data by frequency-analyzing a time waveform of the modulated signal which is formed of a data period of one modulation time and a guard interval succeeding the data period and which includes in the data period a period having correlation with the guard interval and provided at a position away from the modulated signal by the one modulation time, a correlation circuit for detecting correlation between the guard interval of the modulated signal and the period in the data period having correlation with the guard interval and provided at a position away from the modulated signal by the one modulation time, and a synchronization signal generating circuit including the correlation circuit and for generating a synchronization signal based on a detection output from the correlation circuit. The correlation is detected in a predetermined period which is ½ as long as each of the guard interval and the period having correlation with the guard interval and in which correlation can substantially be detected. Therefore, it is possible to shorten a time for generating the synchronization signal.

4 Claims, 5 Drawing Sheets

FIG. 1
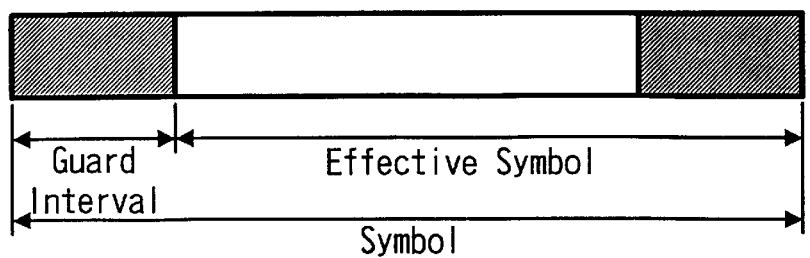
FIG. 2A Original Signal
FIG. 2B Delayed Signal
FIG. 2C Correlation Signal
FIG. 2D Signal Obtained by Subjecting Correlation Signal to Interval Integration
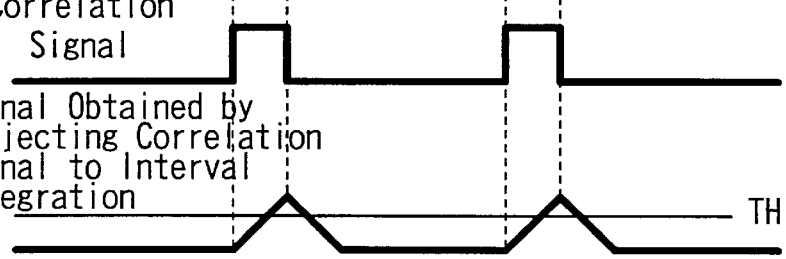

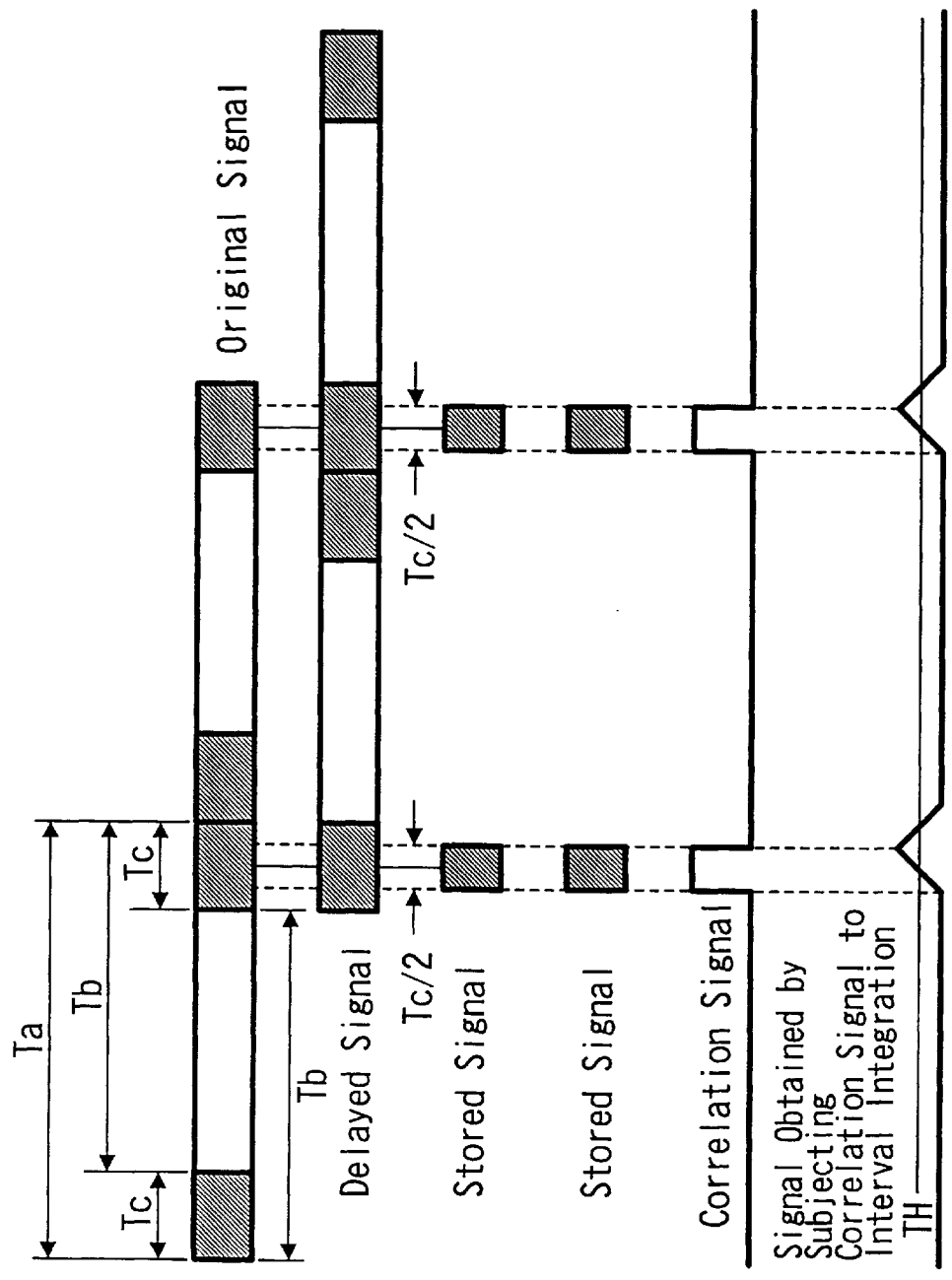

DEMODULATING APPARATUS

BACKGROUND OF THE INVENTION

1. Field of the Invention

The present invention relates to a demodulating apparatus for demodulating a modulated signal obtained by modulating a plurality of carriers having different frequencies by using data.

2. Description of the Related Art

As a modulating apparatus for demodulating a modulated signal obtained by modulating a plurality of carriers having different frequencies by using data, an apparatus for demodulating an orthogonal frequency division multiplex (OFDM) modulated signal (hereinafter referred to as an OFDM modulated signal) employed in a digital audio broadcasting (DAB) or the like carried out in Europe has been proposed.

In this OFDM modulation, data such as audio data or the like are encoded by using a modulated signal using a large number of carriers whose frequency components have orthogonal relationships with one another, and the encoded data are allocated to the respective carriers to thereby modulate the respective carriers. Further, a digital signal in a frequency domain formed of the respective modulated carriers is converted by inverse fast Fourier transform into a digital signal in a time domain, and then the digital signal in the time domain is converted into an analog signal. When the modulated signal is demodulated, the OFDM modulated signal is converted into a digital signal, and then the digital signal is subjected to fast Fourier transform, thus the encoded data allocated to the respective carriers being obtained.

In the OFDM modulation in the DAB, the respective carriers are subjected to a quadrature phase shift keying (QPSK) modulation by allocating one carrier to two-bit data each. Therefore, this modulation is referred to as OFDM-QPSK modulation.

In the OFDM modulation, the point number of the fast Fourier transform corresponds to the number of carriers. According to a DAB standard, the-point number is changed depending upon modes. In modes 1, 2, 3, 4 thereof, the point number is 1536, 384, 192, 768, respectively. Accordingly, if the mode is the mode 1, it is possible to transmit data of 2 (bits)×1536=3072 (bits) by the OFDM modulation. This transmission unit is called as a symbol. In the modes 1, 2 and 4, a group of seventy-six symbols is referred to as a frame, and in the mode 3, a group of one hundred and fifty-three symbols is referred to as a frame. Each of the above numbers of the symbols in one frame does not include the number of a null symbol.

Synchronization is usually adjusted by adding several synchronization symbols each formed of synchronization adjustment data to a head of one frame. According to the DAB standard, of the seventy-seven symbols or one hundred and fifty-four symbols (both of which include the null symbol and are respectively those in the modes 1, 2 and 4 and the mode 3), two symbols including a null symbol are employed as the synchronization symbol. A demodulation side (reception side) compares amplitudes of a real-number portion and an imaginary-number portion of the synchronization data subjected to the fast Fourier transform with a previously held amplitude of the normal synchronization data (i.e., an amplitude of synchronization data practically set by a transmission side) to calculate a difference between synchronization phases upon fast Fourier transform. Further, the demodulation side adjusts a timing of the fast Fourier transform in response to the synchronization phase difference to obtain synchronization. In this method, since the synchronization can be obtained only once in one frame, it disadvantageously takes a considerable time to obtain synchronization.

A synchronization generating processing for generating a synchronization signal on the demodulation side (reception side) based on the signal obtained by converting the OFDM modulated signal into an analog signal will be described. The above symbol will be described with reference to FIG. 1. The symbol is formed of a guard interval positioned on its head side and an effective symbol positioned on its end side. The effective symbol includes a period having correlation to the guard interval, i.e., a period having the same signal portion and the same interval on the end side thereof.

An original signal (e.g., a symbol of mode 1) shown in FIG. 2A is delayed by a time corresponding to an effective symbol period in the symbol. A signal of a period on the end side of the original signal shown in FIG. 2A corresponding to the guard interval (whose period is about ⅕ as long as the symbol period) and a signal of a guard interval of the delayed signal shown in FIG. 2B are stored in a memory, and then both of the signals stored in the memory are multiplied with each other by using a digital signal processor (DSP) or the like. A product of the multiplication is integrated by a low-pass filter, thereby correlation being detected. Then, since the signal on the end side of the effective symbol of the symbol of the original signal which has the same interval and the same signal portion as those of the guard interval and the signal of the guard interval of the symbol of the delayed signal are the same, i.e., have the same correlation with each other, a correlation signal having a rectangular waveform (shown in FIG. 2C) is obtained.

If the correlation signal is subjected to interval integration (moving average) using a width of time corresponding to the guard interval in the symbol, then there can be obtained as shown in FIG. 2D a signal which has an axially symmetric triangular waveform and which starts being inclined upward at the rising edge of the correlation signal indicative of correlation and having a rectangular waveform and starts being inclined downward at the trailing edge of the correlation signal. As shown in FIG. 2D, the signal obtained by subjecting the correlation signal to interval integration is compared with a threshold level TH slightly lower than an amplitude level of the practically obtained triangular wave signal, and thereby a noise is removed therefrom to obtain only the normal signal obtained by subjecting the correlation signal to interval integration. A peak position of the signal obtained by subjecting the correlation signal to interval integration is discriminated, thereby a time synchronization signal synchronized with the discriminated peak position being generated.

A guard interval removal signal is generated based on the time synchronization signal. The guard interval in the signal obtained by converting the OFDM modulated signal into an digital signal is removed by the guard interval removal signal and then the timing of the fast Fourier transform is controlled based on the time synchronization signal. The time synchronization signal is also used when data of a signal subjected to the fast Fourier transform is decoded.

A phase of the time synchronization signal is discriminated. Based on the discrimination result, a frequency synchronization signal is generated. The time synchronization signal is converted into an analog signal, i.e., an auto frequency control (AFC) signal (frequency control signal).

An oscillation frequency of a local oscillator for frequency conversion is controlled based on the AFC signal. A RF reception signal is thus frequency-converted into a signal having an intermediate frequency, and then subjected to the above A/D conversion.

At present, the known DAB signals are signals of modes 1, 2, 3, 4. A determined basic period thereof is T (=1/2048000 sec=0.00048828 nsec). FIG. 3 shows a structure of the DAB signal of the mode 1, by way of example. In FIG. 3, the basic period T and time are both indicated. One frame of the mode 1 DAB signal is 196608 T (=96 msec) and formed of one null symbol (symbol number 1=0) having an interval of 2656 T (=1.297 msec) and seventy-six symbols (symbol numbers 1=1 to 76) succeeding the null symbol and each having an interval of 2552 T (=1.246 msec).

Each of symbols having the symbol numbers 1=1 to 76 is formed of a guard interval having an interval of 504 T (=246 $\mu$sec) and an effective symbol at-the succeeding position and having an interval of 2048 T (+1 msec). Effective symbols of the respective symbols having the symbol numbers 1=1 to 76 include multicarriers of the number of k=1536 having frequencies different from one another. A carrier indicated by 0 is a carrier having a center frequency (a period of the carrier is T). A carrier indicated by 1536/2 (=766) is a carrier having a maximum frequency, and a carrier indicated by −1536/2 (=−766) is a carrier having a minimum frequency. A data amount of one symbol includes 1536 waves, and a data amount thereof is 1536×2 bits, i.e, 48 capacity units (CU)×64 bits.

The whole symbols having the symbol numbers 1=1 to 76 are referred to as an OFDM symbol.

In case of the mode 1, for example, the null symbol having the symbol number 1=0 and the symbol having the symbol number 1=1 are referred to as time frequency and phase reference (TFPR) symbols, respectively. A set of these two symbols is referred to as a synchronization channel (sync. channel). Symbols having the symbol numbers 1=2 to 4 are referred to as fast information channels (FIC). The whole FICs are divided into twelve fast information blocks (FIB). The remaining symbols having the symbol numbers 1=5 to 76 are classified into four common interleaved frames (CIF).

An interval of each symbol of the DAM signal is different depending upon the mode. An interval of each symbol of the mode 2 is ¼ as long as the interval of each symbol of the mode 1. An interval of each symbol of the mode 3 is ⅛ as long as the interval of each symbol of the mode 1. An interval of each symbol of the mode 4 is ½ as long as the interval of each symbol of the mode 1.

Specifically, in the mode 1, the interval of each of the symbols excluding the null symbol is 2552 T (=1.246 msec) as described. In the mode 2, the interval of each of the symbols excluding the null symbol is 638 T (=2552T/4)(= 312 $\mu$sec (=1.246/4 msec)). In the mode 3, the interval of each of the symbols excluding the null symbol is 319 T (=2552T/8)(=156 $\mu$sec (=1.246/8 msec)). In the mode 4, the interval of each of the symbols excluding the null symbol is 1276 T (=2552T/2)(=623 $\mu$sec (=1.246/2 msec)).

In the mode 1, the interval of the effective symbol in the symbol other than the null symbol is 2048 T (=1 msec) as described above. In the mode 2, the interval of the effective symbol in the symbol other than the null symbol is 512 T (=2048 T/4)(=250 $\mu$sec (=1 msec/4)). In the mode 3, the interval of the effective symbol in the symbol other than the null symbol is 256 T (=2048 T/8)(=125 sec (=1 msec/8)). In the mode 4, the interval of the effective symbol in the symbol other than the null symbol is 1024 T (=2048 T/2) (=500 $\mu$sec (=1 msec/2)).

Further, in the mode 1, the time of the guard interval in the symbol other than the null symbol is 504 T (=246 $\mu$sec). In the mode 2, the time of the guard interval in the symbol other than the null symbol is 126 T (=504 T/4) (=61.5 $\mu$sec (=246 $\mu$sec/4)). In the mode 3, the time of the guard interval in the symbol other than the null symbol is 63 T (=504 T/8) (=30.75 $\mu$sec (=246 $\mu$sec/8)). In the mode 4, the time of the guard interval in the symbol other than the null symbol is 252 T (=504 T/2) (=123 $\mu$sec (=246 $\mu$sec/2)).

In the above apparatus for demodulating the OFDM modulated signal, when the synchronization signal is generated, the original signal which is the OFDM modulated signal is delayed by a time corresponding to the interval of the effective symbol of the symbol. Further, the signals of the periods, corresponding to the guard interval, of the original signal and the delayed signal, are stored in the memory. Then, both of the signals stored in the memory are multiplied with each other and then the product of the multiplication is integrated by the low-pass filter, thereby the correlation being detected. The correlation signal having the rectangular waveform and obtained when the correlation is detected is subjected to interval integration, thereby the signal having the triangular waveform being obtained. The synchronization signal is generated by discriminating a peak of the signal having the triangular waveform. Therefore, if the TFPR symbol (second symbol) of each frame is analyzed, then it is possible to shorten the time required for obtaining synchronization as compared with a system of establishing a frequency and time synchronization.

However, as the time of the guard interval is longer, then the number of multiplications for detecting correlation is increased. This increase requires a lot of time and a larger consumed power both for generation of the synchronization signal. Moreover, this increase requires a memory of a large capacity.

SUMMARY OF THE INVENTION

In view of such aspects, it is an object of the present invention to provide a demodulating apparatus which demodulates data by frequency-analyzing a time waveform of a modulated signal that includes a plurality of carriers having different frequencies modulated with data, which is formed of a data interval formed of one modulation time and a guard interval accompanying the data interval and has an interval having correlation with the guard interval at a position away from a modulated signal by one modulation time, and which can provide a shorter time required for generation of a synchronization signal, a smaller consumed power required for generation of the synchronization signal, and a memory of a smaller capacity.

According to an aspect of the invention, the demodulating apparatus is one for demodulating a modulated signal obtained by modulating a plurality of carriers having different frequencies, and includes data demodulating means for demodulating data by frequency-analyzing a time waveform of the modulated signal which is formed of a data period formed of one modulation time and a guard interval succeeding the data period and which includes in the data period a period having correlation with the guard interval and provided at a position away from the modulated signal by-the one modulation time, correlation means for detecting correlation between the guard interval of the modulated signal and the period in the data period having correlation with the guard interval and provided at a position away from the modulated signal by the one modulation time, and synchronization signal generating means comprising the correlation means and for generating a synchronization signal based on a detection output from the correlation means. The correlation is detected in a predetermined period which is ½ as long as each of the guard interval and the period having correlation with the guard interval and in which correlation can substantially be detected.

Therefore, since the correlation is detected in a predetermined period which is ½ as long as each of the guard interval and the period having correlation with the guard interval and in which correlation can substantially be detected, it is possible to obtain a demodulating apparatus which can provide a shorter time for generating the synchronization signal, a smaller consumed power required for generating the synchronization signal and a memory of a smaller capacity.

BRIEF DESCRIPTION OF THE DRAWINGS

FIG. 1 is a diagram showing a symbol;

FIGS. 2A to 2D are timing charts used to explain an operation of a demodulating apparatus;

FIGS. 6A to 6F are timing charts used to explain an operation of the reception apparatus shown in FIG. 5.

DETAILED DESCRIPTION OF THE PREFERRED EMBODIMENT

Figure 4:
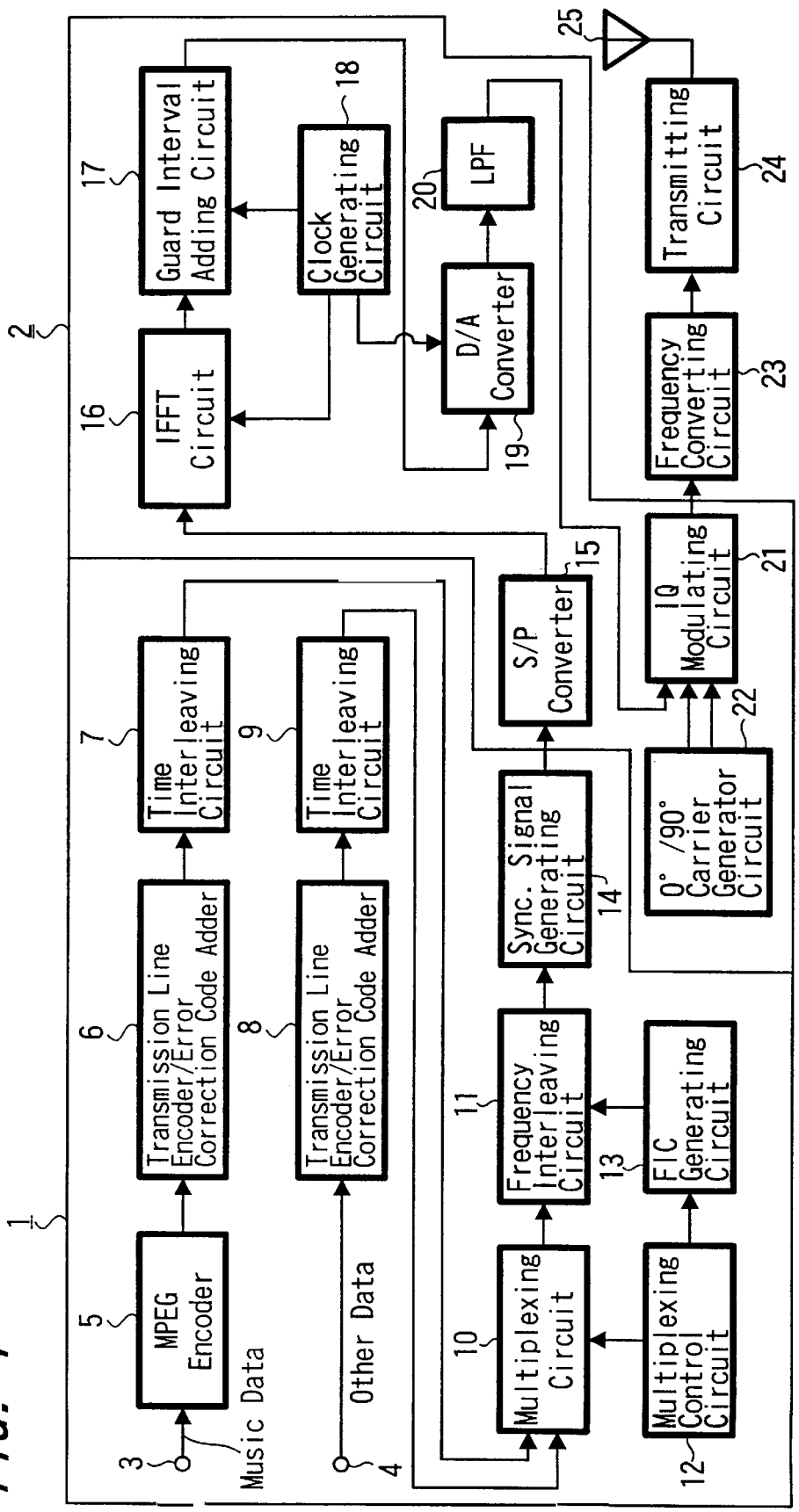
FIG. 4 is a block diagram showing a transmitting apparatus (modulating apparatus) according to an embodiment of the present invention.

A transmission apparatus according to an embodiment of the present invention will hereinafter be described with reference to FIG. 4. A data generating circuit (encoder circuit) 1 is supplied with audio data and other data (e.g, data concerning music, such as a title, a name of an artist, words or the like, data of news, traffic information, still picture or the like, and so on) from input terminals 3, 4 and encodes the supplied data to then supply the encoded data to an OFDM modulator 2. The OFDM modulator 2 subjects the supplied modulated signal to an orthogonal frequency division multiplex processing to obtain an OFDM modulated signal, and then supplies the OFDM modulated signal to a frequency converting circuit 23. The frequency converting circuit 23 converts a frequency of the OFDM modulated signal to obtain a high-frequency signal and then supplies the high-frequency signal to a transmitting circuit 24. The transmitting circuit 24 carries out amplification of the supplied high-frequency signal and so on and then transmits the signal through an antenna 25.

An arrangement of the data generating circuit 1 will be described. An MPEG (moving picture experts group) encoder 5 is supplied with music data (audio data) from the input terminal 3 and compression-encodes the music data to supply the compression-encoded music data to a transmission line encoder/error correction code adder 6. The transmission line encoder/error correction code adder 6 divides data of one symbol amount into data groups each formed of adjacent two bits and allocates carriers having different frequencies to each of the data group, then adding an error correction code to the data thus encoded. Then, the transmission line encoder/error correction code adder 6 supplies the encoded data to a time interleaving circuit 7. The time interleaving circuit 7 interleaves the supplied encoded data and then supplies the interleaved music data to a multiplexing circuit 10.

A transmission line encoder/error correction code adder 8 is supplied with other data (e.g. data concerning music, such as a title, a name of an artist, words or the like, data of news, traffic information, still picture or the like, and so on) from the input terminal 4. The transmission line encoder/error correction code adder 8 divides data of one symbol amount into data groups each formed of adjacent two bits and allocates carriers having different frequencies to each of the data groups, then adding an error correction code to the data thus encoded. Then, the transmission line encoder/error correction code adder 8 supplies the encoded data to a time interleaving circuit 9. The time interleaving circuit 9 interleaves the supplied encoded data and then supplies the interleaved other data to a multiplexing circuit 10 in which the other data is multiplexed on the interleaved music data.

Under the control of a multiplexing control circuit 12, the multiplexing circuit 10 adjusts an order of the data in a frequency domain in accordance with a frame arrangement of the set mode. Under the control of the multiplexing control circuit 12, a fast information channel (FIC) generating circuit 13 adjusts an order of the data in a frequency domain in accordance with a frame arrangement of the set mode. A frequency interleaving circuit 11 is supplied with a multiplexed signal from the multiplexing circuit 10 and an FIC signal from the FIC generating circuit 13 and then frequency-interleaves both of the supplied signals, and then supplies the frequency-interleaved data to a sync. signal generating circuit 14. The sync. signal generating circuit 14 adds a generated time-frequency-phase-reference symbol (TFPR symbol) synchronization signal to the supplied signal.

An arrangement of the OFDM modulator 2 will be described. A serial/parallel converter 15 is supplied with a frequency-interleaved output signal added with the TFPR symbol synchronization signal and supplied from the synchronization signal generating circuit 14 of the data generating circuit 1, and then converts it into parallel data to supply the parallel data to an inverse fast Fourier transform circuit 16. The inverse fast Fourier transform circuit 16 subjects the parallel data to the inverse fast Fourier transform, i.e., sets a real-number portion signal and an imaginary-number portion signal of an output series formed of the respective carriers in response to the parallel data and then converts them into a real-number portion signal and an imaginary-number portion signal of a time series. The inverse fast Fourier transform circuit 16 supplies the real-number portion signal and the imaginary-number portion signal of the time series to a guard interval adding circuit 17. The guard interval adding circuit 17 adds the guard interval thereto, and then supplies the parallel data added with the guard interval to a D/A converter 19 through a low-pass filter 20. The D/A converter converts the supplied parallel data into an analog signal, and then carries out an interpolation processing.

An IQ modulating circuit 21 is supplied with the real-number portion signal and the imaginary-number portion signal from the D/A converter 19, and then subjects them to orthogonal modulation. The IQ modulating circuit 21 is supplied with carriers having phases of 0° and 90° from a 0°/90° carrier generating circuit 22. A clock signal from a clock generating circuit 18 is supplied to the inverse fast Fourier transform circuit 16, the guard interval adding circuit 17 and the D/A converter circuit 19.

The frequency converting circuit 23 is supplied with the OFDM modulated signal from the IQ modulating circuit 21 and then converts the OFDM modulated signal into a high-frequency signal to supply it the transmitting circuit 24. The transmitting circuit 24 carries out amplification of the high-frequency signal and so on and transmits it through the transmission antenna 25.

Figure 5:
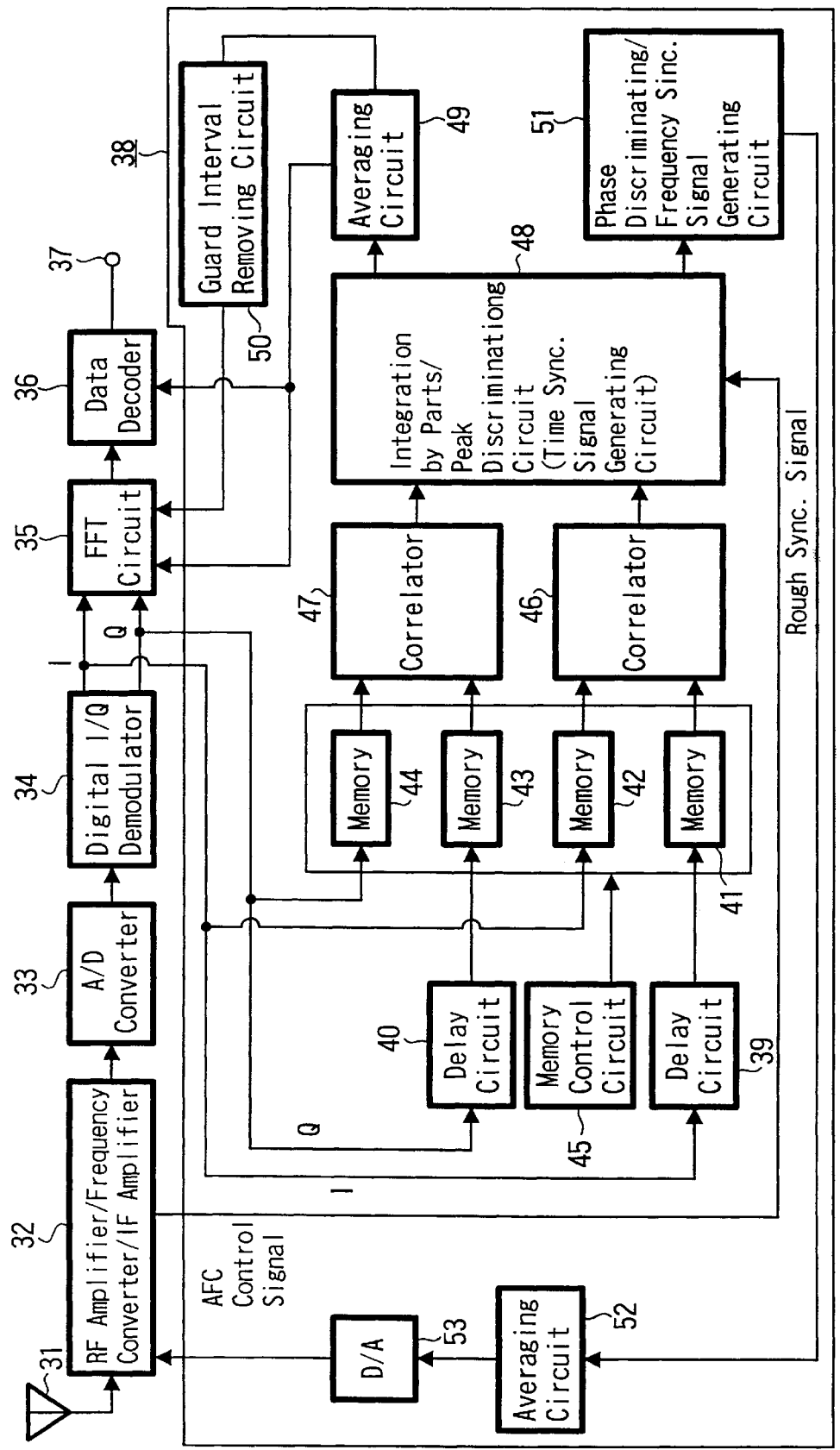
FIG. 5 is a block diagram showing a reception apparatus (demodulating apparatus) according to an embodiment of the present invention.

A reception apparatus according to the embodiment of the present invention will be described with reference to FIG. 5. A high-frequency (RF) amplifier/frequency converter/an intermediate-frequency (IF) amplifier 32 is supplied with a received signal from an antenna 31 and then carries out amplification of a high frequency, frequency conversion and amplification of an intermediate frequency to thereby obtain a OFDM modulated signal of a base band. The RF amplifier/frequency converter/IF amplifier 32 supplies the OFDM modulated signal to an A/D converter 33. The A/D converter 33 converts the supplied OFDM modulated signal into digital data and supplies the digital data to a digital I/Q demodulator 34. The digital I/Q demodulator 34 demodulates the supplied OFDM modulated signal to obtain real-number portion data and imaginary-number portion data.

A fast Fourier transform circuit 35 is supplied with the real-number portion data and the imaginary-number portion data of the time series from the digital I/Q demodulator 34 and then, after a guard interval removing circuit 50 of the synchronization signal generating circuit 38 removes a guard interval therefrom, converts them into the real-number portion data and the imaginary-number portion data of the frequency series. The fast Fourier transform circuit 35 supplies real-number portion data and the imaginary-number portion data of the frequency series to a data decoder 36. The data decoder 36 decodes the supplied data to output the decoded data to an output terminal 37. The data decoder 36 is formed of a frequency deinterleaving circuit, a time deinterleaving circuit, and an error correcting circuit which are successively connected in series.

An arrangement of the synchronization signal generating circuit 38 of the reception apparatus will be described. The real-number portion data and the imaginary-number portion data from the digital IQ demodulator 34 are supplied directly to memories 42, 44 of the synchronization signal generating circuit 38 and also supplied through delay circuits 39, 40 to memories 41, 43. FIG. 6A shows an original signal formed of a real-number portion or an imaginary-number portion, wherein reference letters Ta, Tb and Tc respectively represent a symbol period, an effective symbol (data period in one modulation time), and a guard interval. A period Tc provided at the end of the effective symbol period Tb is a period having correlation with the guard interval Tc. FIG. 6B shows real-number portion data or imaginary-number portion data delayed by the delay circuits 39, 40 by the effective symbol period Tb.

Under the control of a memory control circuit 45, only data (shown in FIGS. 6C, 6D) of a period which has a width of Tc/4 or smaller on both sides relative to a center of the data of the period having the correlation with the period Tc of the original signal and the guard interval Tc, i.e., a total width of Tc/2 or smaller and which is longer than the shortest period where substantial correlation can be detected are written in the memories 42, 44 and 41, 43. A correlator 46 detects correlation between the original signal of the I data and a signal obtained by delaying the I data, and a correlator 47 detects correlation between the original signal of the Q data and a signal obtained by delaying the Q data. When the correlators 46, 47 detect correlation, both of the signals are multiplied with each other by a DSP or the like. In this case, the correlator 46 may detect the correlation between the original signal of the I data and the delayed signal of the Q data, and the correlator 47 detecting the correlation between the original signal of the Q data and the delayed signal of the I data. Alternatively, the correlator 46 may detect the correlation between the original signal of the Q data and the delayed signal of the I data, and the correlator 47 detecting the correlation between the original signal of the I data and the delayed signal of the Q data.

The correlation signals having rectangular waveform (shown in FIG. 6E) from the correlators 46 and 47 are supplied to an integration-by-parts/peak discriminating circuit, i.e., a time synchronization signal generating circuit 48, wherein a signal obtained by subjecting a correlation signal to interval integration (as shown in FIG. 6F) (i.e., a signal which has an axially symmetric triangular waveform and which is inclined upward at a period of the correlation signal and inclined downward after an end of the correlation signal period) being obtained. The time synchronization signal generating circuit 48 is supplied with a rough synchronization signal from the RF amplifier/frequency converter/IF-amplifier 32. A level comparing circuit is supplied with the signal obtained by interval integration in order to remove a noise, and compares it with a threshold level TH slightly lower than an amplitude level of the triangular wave signal. Thus, the level comparing circuit removes the noise from the signal obtained by interval integration to obtain a normal signal obtained by subjecting the correlation signal to interval integration. A peak position of the normal signal obtained by interval integration is discriminated, thereby a time synchronization signal synchronized with the peak position being generated.

Figure 3:
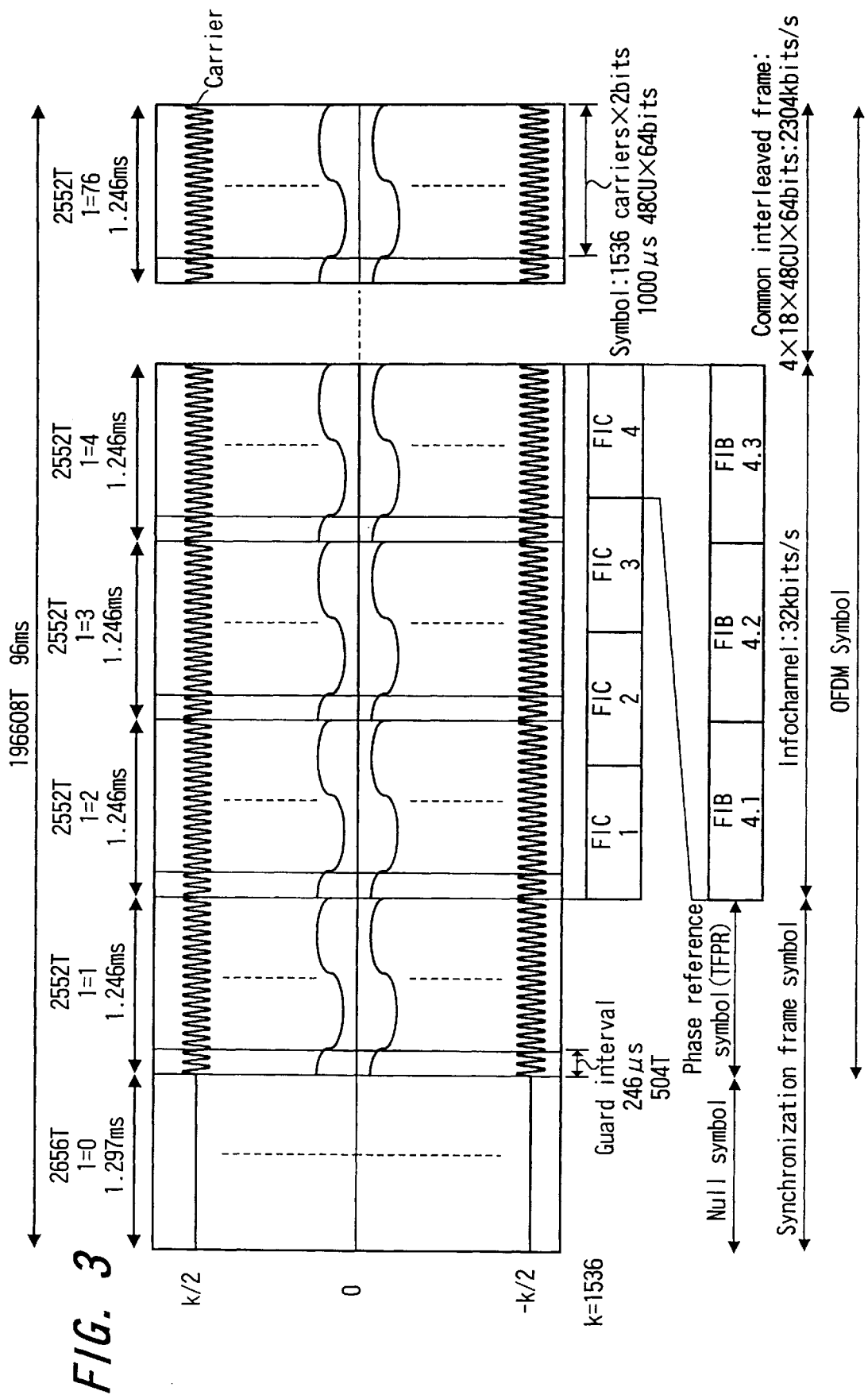
FIG. 3 is a diagram showing a frame structure of a DAB signal of a model 1.

As clear from FIG. 3 which shows a structure of the DAB signal of the mode 1, the frame formed of seventy-six continuous symbols (its number may be smaller, e.g., can be fifty-five, thirty-five, fifteen or the like) excluding the null symbol is successively transmitted. In this frame, the null symbol, the synchronization symbol formed of TFPR symbols, and the symbols including the actual data are provided in this order from the head of the frame.

An averaging circuit 49 averages timings of the time synchronization signals of the respective seventy-six symbols (its number may be smaller, e.g., can be fifty-five, thirty-five, fifteen or the like). Then, the averaging circuit 49 supplies the averaged time synchronization signal to the fast Fourier transform circuit 35 to control the timing of the fast Fourier transform, supplies the time synchronization signal to the data decoder 36 to control synchronization of the respective circuits of the data decoder 36, and supplies the time synchronization signal to the guard interval removing circuit 50 to generate the guard interval removal signal.

The time synchronization signal generating circuit 48 also supplies the time synchronization signal to a phase discriminating/frequency synchronization signal generating circuit 51. The phase discriminating/frequency synchronization signal generating circuit 51 generates a frequency synchronization signal by discriminating a phase thereof and supplies the frequency synchronization signal to an averaging circuit 52. The averaging circuit 52 averages the frequency synchronization signals of the seventy-six symbols and supplies the average frequency synchronization signal to a D/A converter 53. The D/A converter 53 converts the supplied average frequency synchronization signal into an analog signal to obtain an AFC signal, and then supplies the AFC signal to a local oscillator of the frequency converter of the RF amplifier/frequency converter/IF amplifier 32 to control an oscillation frequency thereof.

When a frequency deviation is 10 Hz, even if a period during which data is written in the memories 42, 44 and 41, 43 is set shorter, up to about Tc/16, it is possible to obtain the high-accuracy synchronization signal.

According to a first aspect of the invention, the demodulating apparatus for demodulating a modulated signal obtained by modulating a plurality of carriers having different frequencies by data includes data demodulating means for demodulating data by frequency-analyzing a time waveform of the modulated signal which is formed of a data period formed of one modulation time and a guard interval succeeding the data period and which includes in the data period a period having correlation with the guard interval and provided at a position away from the modulated signal by the one modulation time, correlation means for detecting correlation between the guard interval of the modulated signal and the period in the data period having correlation with the guard interval and provided at a position away from the modulated signal by the one modulation time, and synchronization signal generating means comprising the correlation means and for generating a synchronization signal based on a detection output from the correlation means. The correlation is detected in a predetermined period which is ½ as long as each of the guard interval and the period having correlation with the guard interval and in which correlation can substantially be detected. Therefore, since the correlation is detected in a predetermined period which is ½ as long as each of the guard interval and the period having correlation with the guard interval and in which correlation can substantially be detected, it is possible to obtain a demodulating apparatus which can provide a shorter time for generating the synchronization signal, a smaller consumed power required for generating the synchronization signal and a memory of a smaller capacity.

According to a second aspect of the present invention, the synchronization signal generating means comprises time synchronization signal generating means for subjecting the detection output from the correlation means to interval integration, discriminating a peak of a waveform subjected to the interval integration, and generating a time synchronization signal synchronized with the peak, and a timing of frequency-analyzing the time waveform of the modulated signal is controlled based on the time synchronization signal from the time synchronization signal generating means. Therefore, since the correlation is detected in a predetermined period which is ½ as long as each of the guard interval and the period having correlation with the guard interval and in which correlation can substantially be detected, it is possible to obtain a demodulating apparatus which can provide a shorter time for generating the time synchronization signal used for controlling the timing of frequency-analyzing the time waveform of the modulated signal, a memory of a smaller capacity, and a smaller consumed power required for generating the synchronization signal.

According to a third aspect of the present invention, the data of the modulated signal is encoded data, the demodulating means comprises decoding means for decoding the frequency-analyzed output, and the decoding means is controlled based on the time synchronization signal from the time synchronization signal generating means. Therefore, it is possible to obtain a demodulating apparatus which can provide a shorter time for generating the time synchronization signal used for controlling the timing of frequency-analyzing the time waveform of the modulated signal-and the timing of the decoder means, a memory of a smaller capacity, and a smaller consumed power required for generating the synchronization signal.

According to a fourth aspect of the present invention, a demodulating apparatus further includes frequency converter means for frequency-converting a received signal to obtain the modulated signal of a base band, the synchronization signal generating means includes frequency synchronization signal generating means for discriminating a phase of the time synchronizing signal from the time synchronization signal generating means to thereby generate a frequency synchronization signal, and an oscillation frequency of local oscillation means of the frequency converter means is controlled based on the frequency synchronization signal from the frequency synchronization signal generating means. Therefore, it is possible to obtain a demodulating apparatus which can provide a shorter time required for generating the time synchronization signal used for controlling the timing of frequency-analyzing the time waveform of the modulated signal and for generating the frequency synchronization signal used for controlling the oscillation frequency of the local oscillator means of the frequency converter means, a memory of a smaller capacity, and a smaller consumed power required for generating the synchronization signal.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A demodulating apparatus for demodulating a modulated data signal modulated by a plurality of carriers having different respective frequencies, comprising:

data demodulating means for demodulating the data signal by frequency-analyzing a time waveform of said modulated data signal formed of a data period of one modulation time and a guard interval succeeding said data period, wherein said data period includes a period having correlation with said guard interval and provided at a position away from said modulated data signal by said one modulation time;

correlation means for detecting correlation between said guard interval of said modulated data signal and said period in said data period having correlation with said guard interval and provided at said position away from said modulated data signal by said one modulation time;

memory control means for storing said guard interval and/or said period having correlation with said guard interval in a memory; and synchronization signal generating means for generating a synchronization signal based on a detection output from said correlation means, wherein correlation is detected in a predetermined period shorter in length than each of said guard interval and said period having correlation with said guard interval, whereby correlation can substantially be detected.

2. The demodulating apparatus according to claim 1, wherein said synchronization signal generating means includes time synchronization signal generating means for subjecting the detection output from said correlation means to interval integration, for discriminating a peak of a waveform subjected to said interval integration, and for generating a time synchronization signal synchronized with said peak, and wherein a timing of frequency-analyzing the time waveform of said modulated data signal is controlled based on the time synchronization signal from said time synchronization signal generating means.

3. The demodulating apparatus according to claim 2, wherein data of said modulated data signal is encoded data, said data demodulating means includes decoding means for decoding a frequency-analyzed output, and said decoding means is controlled based on the time synchronization signal from said time synchronization signal generating means.

4. The demodulating apparatus according to claim 2, further comprising:

frequency converter means for frequency-converting a received signal for obtaining said modulated data signal of a base band, wherein said synchronization signal generating means includes frequency synchronization signal generating means for discriminating a phase of the time synchronization signal from said time synchronization signal generating means and for generating a frequency synchronization signal, and wherein an oscillation frequency of local oscillation means of said frequency converter means is controlled based on the frequency synchronization signal from said frequency synchronization signal generating means.

* * * * *